US010011334B2

(12) United States Patent
Pascal

(10) Patent No.: US 10,011,334 B2
(45) Date of Patent: Jul. 3, 2018

(54) MARINE OBJECT ABLE TO FLOAT ON WATER, COMPRISING A DEPLOYABLE DEVICE FOR EMITTING AND/OR RECEIVING ELECTROMAGNETIC WAVES

(71) Applicant: THALES, Courbevoie (FR)

(72) Inventor: Jean-Marcelin Pascal, Nice (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/909,588

(22) PCT Filed: Jul. 30, 2014

(86) PCT No.: PCT/EP2014/066383
§ 371 (c)(1),
(2) Date: Feb. 2, 2016

(87) PCT Pub. No.: WO2015/018715
PCT Pub. Date: Feb. 12, 2015

(65) Prior Publication Data
US 2016/0194065 A1 Jul. 7, 2016

(30) Foreign Application Priority Data

Aug. 2, 2013 (FR) .................................... 13 01861

(51) Int. Cl.
*B63G 8/00* (2006.01)
*H01Q 1/04* (2006.01)
(Continued)

(52) U.S. Cl.
CPC .............. *B63G 8/001* (2013.01); *H01Q 1/04* (2013.01); *B63B 2022/006* (2013.01);
(Continued)

(58) Field of Classification Search
CPC .............. B63G 8/001; B63G 2008/002; B63G 2008/004; B63B 2201/00; B63B 2201/20;
(Continued)

(56) References Cited

U.S. PATENT DOCUMENTS 4,040,135 A * 8/1977 Arnold ...................... B63C 7/26
116/211
4,357,688 A 11/1982 Dale et al.
(Continued)

FOREIGN PATENT DOCUMENTS

DE 3737342 A1 5/1989

*Primary Examiner* — Daniel V Venne
(74) *Attorney, Agent, or Firm* — Baker & Hostetler LLP

(57) ABSTRACT

An underwater vehicle able to float on the surface of the water comprises a body delimited at least partially by a curved surface, the body defining an enclosure, the underwater vehicle comprising an arm mounted with at least one emitter or at least one receiver of electromagnetic waves, the arm being linked to the body by an articulation joint with a degree of freedom in rotation about an axis of rotation, the articulation joint allowing the arm to pivot reversibly between a retracted position, in which the arm is housed in the enclosure and is flush with the curved surface of the body, and a deployed position in which the arm extends out of the enclosure, the arm comprising a curved outer surface along the length of the arm, being flush with the curved surface of the body when the arm is in its retracted position.

19 Claims, 4 Drawing Sheets

(51) Int. Cl.
 *G01V 1/38* (2006.01)
 *B63B 22/00* (2006.01)

(52) U.S. Cl.
 CPC .... *B63B 2201/20* (2013.01); *B63G 2008/002* (2013.01); *B63G 2008/004* (2013.01); *B63G 2008/005* (2013.01); *G01V 1/3835* (2013.01)

(58) Field of Classification Search
 CPC .. H01Q 1/00; H01Q 1/04; H01Q 1/08; H01Q 1/084; H01Q 1/12; H01Q 1/1235; H01Q 1/1242
 USPC .................................. 441/1, 6, 11, 32, 33
 See application file for complete search history.

(56) References Cited

U.S. PATENT DOCUMENTS

| | | | |
|---|---|---|---|
| 4,901,288 A | | 2/1990 | Baker et al. |
| 4,981,453 A | * | 1/1991 | Krishan ................ B63B 22/003 248/309.1 |
| 5,022,013 A | * | 6/1991 | Dalton ................... H04B 13/02 367/4 |
| 5,616,059 A | | 4/1997 | Solomon |
| 6,269,763 B1 | | 8/2001 | Woodland |
| 2008/0132130 A1 | | 6/2008 | Nigel |

\* cited by examiner

MARINE OBJECT ABLE TO FLOAT ON WATER, COMPRISING A DEPLOYABLE DEVICE FOR EMITTING AND/OR RECEIVING ELECTROMAGNETIC WAVES

CROSS-REFERENCE TO RELATED APPLICATIONS

This application is a National Stage of International patent application PCT/EP2014/066383, filed on Jul. 30, 2014, which claims priority to foreign French patent application No. FR 1301861, filed on Aug. 2, 2013, the disclosures of which are incorporated by reference in their entirety.

FIELD OF THE INVENTION

The field of the invention is that of the communication devices installed on marine objects able to float on the surface of the water, notably on submersible underwater vehicles such as autonomous underwater vehicles, also called AUV, or manned underwater vehicles, also called UUV.

BACKGROUND

When an AUV or a UUV leaves on mission, it performs its mission at depth and returns to the surface in order to be retrieved by a surface vessel. Now, the AUV or the UUV does not always surface at the position at which it should theoretically surface. Operators located on the surface of the water, or on land, need to know the position of the AUV or UUV to come to retrieve it. The AUV or UUV may, moreover, need to know its position at a given moment in its mission. It then surfaces before diving again. This is called self-relocation. Then, during a mission, in the context of a "pack of AUV or UUV", the latter may be required to exchange data between them or with another platform, and thus surface for that purpose.

The AUVs or UUVs are therefore conventionally equipped with a wireless antenna for receiving satellite signals in a line of sight with satellites and an emitting wireless antenna making it possible to transmit the position of the vehicle remotely or exchange data with the outside world. These antennas have to be extended as far as possible above the surface of the water to allow for the reception of the signals emitted by the satellites and the transmission of wireless signals with good performance levels.

The antennas are generally installed on a fixed strut extending vertically above the underwater vehicle. This arrangement offers the advantage of being insensitive to the sea conditions, compared to a so-called flush arrangement in which the antennas are flush with the surface of the body of the AUV or of the UUV. The flush antennas are covered with a thin layer of salt water, which covers the antennas, which degrades the performance of the antenna in heavy sea conditions. The flush antennas stop being efficient beyond a sea condition 2. The arrangement on a fixed strut does, however, present the drawback of affecting the hydrodynamic profile of the vehicle and its navigation.

One solution for mitigating these drawbacks is to install the antennas on a deployable strut which is retracted, that is to say drawn back into the body of the vehicle when it is navigating and which is extended out of the body for communication when the vehicle resurfaces. These are called deployable antennas. There are different types of deployable antennas. In a first type, the antennas are deployed by the translation of the strut in a radial direction defined relative to the longitudinal axis of the AUV. This is called hoistable strut. The strut in retracted position then extends along a diameter of the vehicle. This first solution considerably affects the accommodation capacity in the AUV, which significantly reduces its payload. In a second solution, the strut is deployed by rotation about a horizontal axis at right angles to the longitudinal axis of the underwater vehicle. In its retracted position, the strut extends parallel to the longitudinal axis of the AUV and, in its deployed position, along a vertical axis. The drawback of this solution is that it affects the rake of the AUV. The further the communication equipment has to be extended above the surface of the water, the longer the strut has to be and the more the length of the AUV has to be increased accordingly. In other words, the performance s of the antennas are highly dependent on a length of a portion of the underwater vehicle, which is utilized and a length which the strut can extend.

The aim of the invention is to mitigate all or some of these abovementioned drawbacks.

SUMMARY OF THE INVENTION

To this end, the invention relates to a marine object able to float on the surface of the water comprising a body delimited at least partially by a curved surface comprising a housing forming said curved surface. The marine object comprises a deployable device comprising an arm on which are mounted emitting/receiving devices for emitting and/or receiving electromagnetic waves, said arm being linked to said body by means of an articulation joint with a degree of freedom in rotation about an axis of rotation, the articulation joint allowing the arm to pivot reversibly between a retracted position, in which the arm is housed in the housing and is flush with the curved surface, and a deployed position in which the arm extends out of said housing, the arm comprising a first surface, called an outer surface; the outer surface is curved along the length of the arm. The outer surface is flush with said curved surface and follows the curve of said curved surface when the arm is in its retracted position.

Advantageously, the arm is curved, the curvature of the arm following the curvature of said outer surface.

Advantageously, said arm extends at right angles to said axis of rotation.

Advantageously, said marine object is balanced such that a plane of flotation relative to the body stabilizes parallel to the surface of the water when said marine object floats in calm sea conditions, the axis of rotation being parallel to the plane of flotation, the arm extending from the body from a first end with a second end located further away from the articulation joint on the body than the first end, said arm comprising a first part corresponding to the region of the arm located at a maximum elevation above the plane of flotation when the arm is in the deployed position, the first part being located near the second end.

Advantageously, the deployed position is defined such that, when the arm is in the deployed position, an axis, called a vertical axis, passing through the first part and the articulation joint, is at right angles to the plane of flotation in calm sea conditions.

Advantageously, the arm comprises a second part corresponding to a region of the arm situated at a maximum elevation when the arm is in the retracted position, the second part being located on a vertical axis thereof.

Advantageously, the marine object comprises a section comprising the arm, the section being produced in a plane at right angles to the axis of rotation when the arm is in the retracted position, the section being delimited by a closed curve, said closed curve having a perimeter; the portion of the perimeter over which the arm extends between the articulation and the first part is defined, for a given position of the articulation, relative to the body, and for a predetermined angle formed between the axis of rotation and the plane of flotation, as being the minimum portion of the perimeter such that, when the arm is in the deployed position, the distance separating the first part from the articulation joint along the vertical axis is the maximum distance that can be obtained for said section.

Advantageously, the curve is a circle, in which said portion of the circumference is equal to half of the circumference of the circle.

Advantageously, the length of the arm is greater than half of the circumference of the circle, the arm pivoting by an angle substantially equal to 180° between the deployed position and the retracted position.

Advantageously, the first part is situated on the outer surface, in which the outer surface is convex at least in a region encompassing the first part.

Advantageously, the arm comprises a strut linking a head to the articulation joint, the head comprising the first part and delimiting a housing in which are housed the emitting/receiving device.

Advantageously, the head comprises a support on which are mounted the emitting/receiving device, the support extending substantially parallel to the plane of flotation, in calm sea conditions, when the arm is in the deployed position.

Advantageously, the head is wider than the strut along the axis of rotation.

Advantageously, the body locally has, around the arm, a cylinder form, the axis of rotation being parallel to the longitudinal axis of the cylinder.

Advantageously, the cylinder is a cylinder of revolution.

Advantageously, the body is the body of an underwater vehicle.

Advantageously, the object locally has neutral buoyancy, in a region comprising the arm.

Advantageously, the deployable device is rigid.

BRIEF DESCRIPTION OF THE DRAWINGS

Other features and advantages of the invention will become apparent on reading the following detailed description, given as a nonlimiting example and with reference to the attached drawings in which.

From one figure to another, the same elements are identified by the same references.

DETAILED DESCRIPTION

Figure 1:
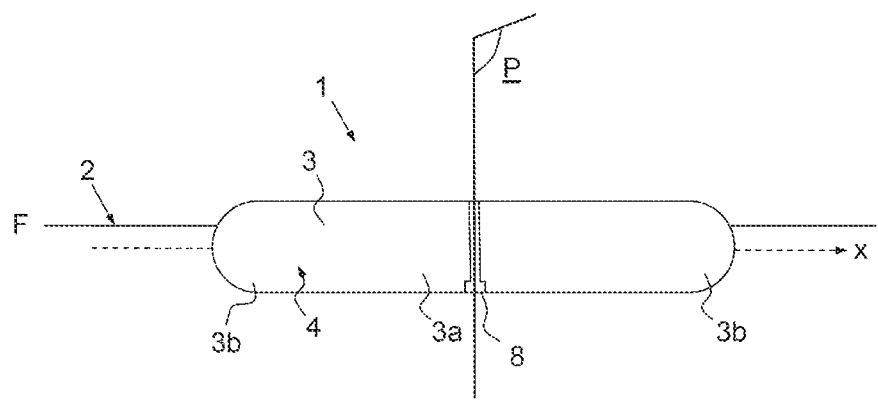
FIG. 1 schematically represents, in side view, an exemplary object according to the invention of the underwater vehicle type provided with a deployable device, FIGS. 2a and 2b schematically represent, in perspective, a section of the underwater vehicle of FIG. 1 in which the deployable device is retracted and, respectively, deployed, FIGS. 3a and 3b schematically represent the underwater vehicle of FIG. 1 in cross section along an axis at right angles to the longitudinal axis of the underwater vehicle, in which the deployable device is retracted and, respectively, deployed, FIG. 4 schematically represents a section of another exemplary underwater vehicle according to the invention in which the deployable emitting/receiving device is retracted.

The invention relates to a marine object or underwater vehicle 1 able to float on the surface of the water 2 which can be seen in FIG. 1. The marine object 1 comprises a body 3 which is, for example, the body of an underwater vehicle 1 as represented in the example of FIGS. 1 to 3b. An underwater vehicle 1 is a submersible vehicle. The underwater vehicle 1 can be an autonomous underwater vehicle, or not, self-propelled, towed or drifting. The body 3 is delimited at least partially by a curved surface 4 which is, here, the outer surface of the hull 5 of the underwater vehicle 1. The hull 5 of the underwater vehicle 1 is referenced in FIGS. 2a and 2b. The curved surface 4 is therefore the surface of the body of the underwater vehicle 1 oriented toward the exterior of the underwater vehicle 1, that is to say toward the exterior of the body 3 of the underwater vehicle 1 or a portion of the surface of the body 3 under water. The body 3 of the underwater vehicle comprises a central part 3a having a generally cylindrical form and ends 3b having, conventionally but in a nonlimiting manner, generally hemispherical forms. "Curved surface" should be understood, in the present patent application, to mean a surface whose direction varies without forming any angle. "Angle" should be understood to mean the figure formed by the intersection of a number of planes. In other words, the curved surface does not include any protruding or recessed angles, that is to say it has no angular points. The surface is also said to be a dished or incurved surface. In other words, by making a section of the curved surface in any plane, at least one curve is obtained in the plane. The curve never includes more than one tangent at a same point. In other words, its derivative is continuous.

Figure 2A:
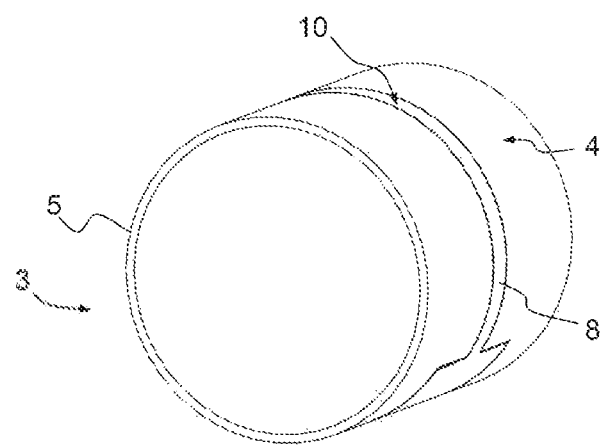
Figure 2B:
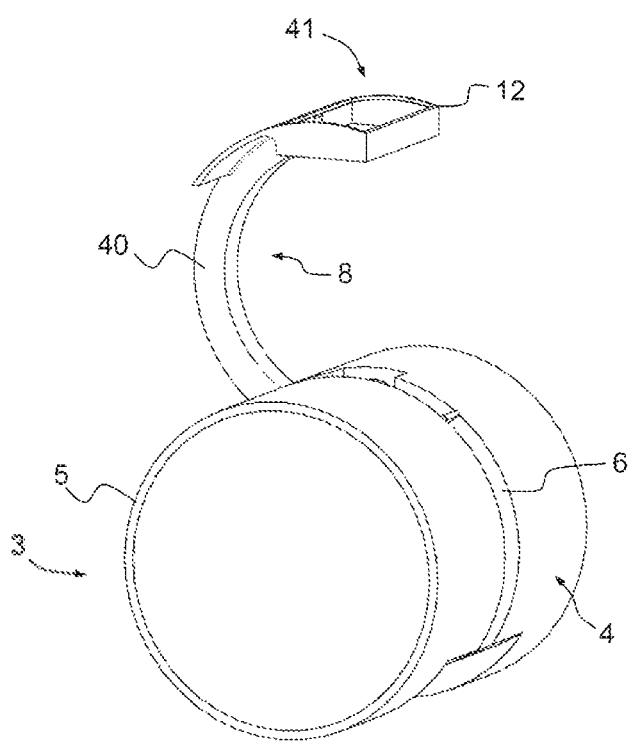

In FIGS. 2a and 2b, a section of the marine object or underwater vehicle 1 has been schematically represented in perspective, in the central part of the body of the underwater vehicle 1 in two situations. The body 3 defines an enclosure 6 visible in FIG. 2b which is formed in the hull 5 of the body 3. This enclosure 6 extends into the body from the curved surface 4. This enclosure 6 takes the form of a trench or channel extending along the curved surface 4. An opening 104 is formed by the enclosure 6, visible in FIG. 3b, which opening 104 is formed in the curved surface 4 such that the enclosure 6 emerges on said curved surface 4 over its entire length.

The underwater vehicle 1 is provided with a deployable device for emitting and/or receiving electromagnetic waves. This deployable device comprises an emitting/receiving device 7 for emitting and/or receiving electromagnetic waves, represented in FIGS. 3a and 3b, comprising at least one emitter and/or at least one receiver of electromagnetic waves. In the embodiment of the figures, the emitting/receiving device 7 comprise an emitter 7a and a receiver 7b. These emitting/receiving devices 7 can comprise wireless communication transceivers allowing the vehicle to communicate with the outside world by a wireless link when located above the surface of the water. The communication means comprise, for example, one or more antennas for receiving signals emitted by satellites of a GPS type. These antennas can be associated with a satellite positioning receiver or GNSS (Global Navigation Satellite Systems) receiver allowing the underwater vehicle 1 to be located. They comprise, for example, one or more antennas for emitting wireless waves making it possible for example to transmit the position of the AUV or of the UUV remotely. Examples of emitting antennas are the satellite telephony antennas of iridium type and the wireless communication antennas emitting in very high frequency or ultra-high frequency bands. They can also comprise a light source, for example, of the flashing light type allowing an operator to locate the AUV at night in the approach phase. It is for example possible to use a xenon lamp or LEDs (light-emitting diodes). For a good transmission of visual signals while limiting the scattering of the visual signals, the light source should be positioned as far as possible from the surface of the water above this surface. It is also possible to provide a camera (receiver of visual signals) making it possible, for example, to film the approaches to a hostile coastline. It is also possible to provide short-range communication antennas, for example of Wi-Fi or Bluetooth type, making it possible, for example, for the surfacing vehicle to communicate (exchange, transmission of acquired data) with another item of equipment of the same type, introducing the concept of "pack" of AUV, or differently, piloting station, surface unit managing the mission, etc. Generally, in the interests of performance, the aim is to arrange these emitting/receiving devices in such a way as to be able to position them as high as possible above the surface of the water when the object 1 floats on the surface of the water.

The features of the deployable device are defined parametrically relative to a curved surface 4 of predetermined form and dimensions and for a particular balancing of the object 1. Advantageously, the deployable device is rigid. In other words, the deployable device mounted on arm 8 does not deform between its retracted position and its deployed position.

Figure 3A:
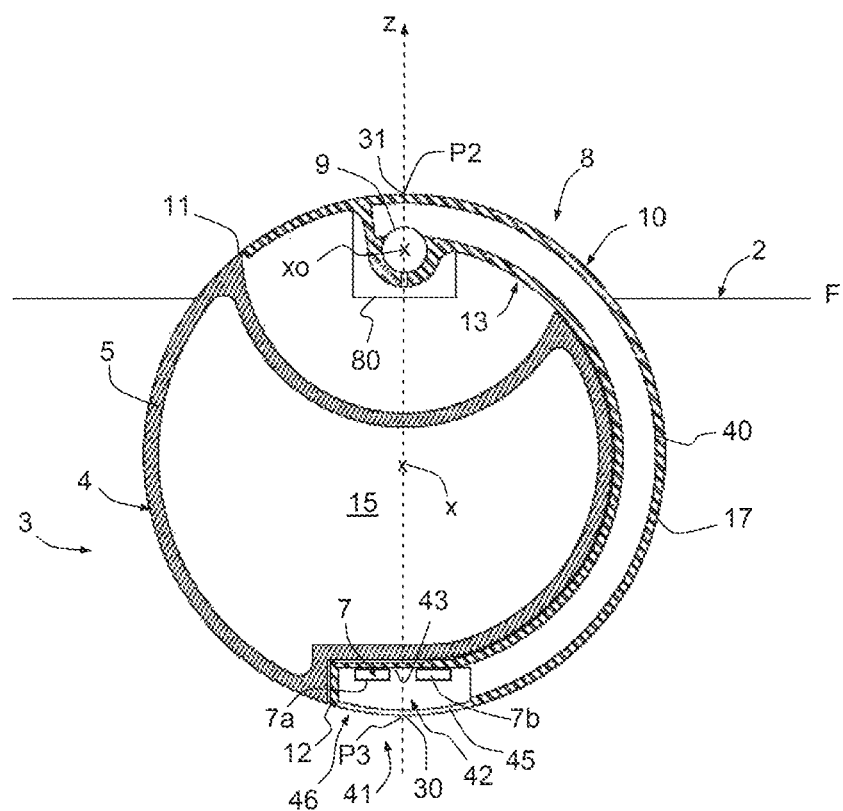
Figure 3B:
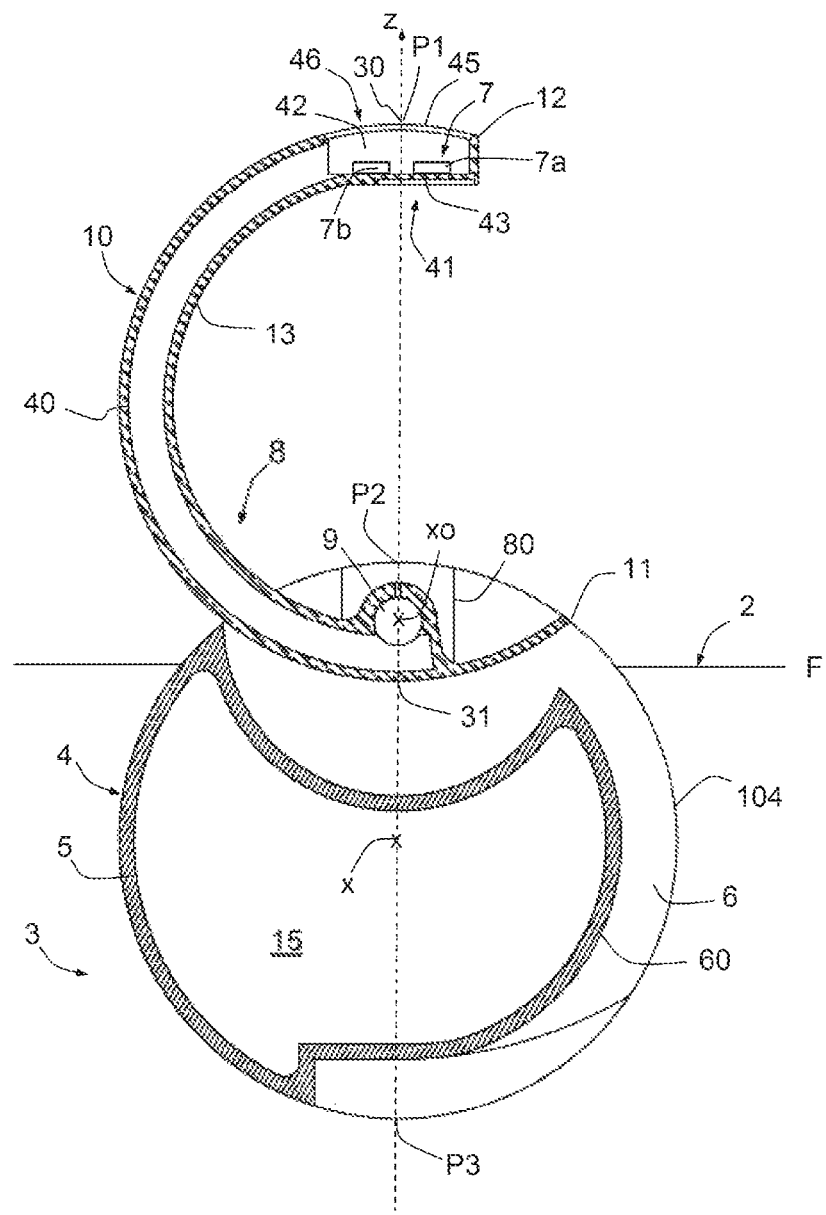

The emitters/receivers 7 are mounted on an arm 8 extending at right angles to the axis of rotation xo. The arm 8 is mobile between a retracted position represented in FIGS. 2a and 3a and a deployed position represented in FIGS. 2b and 3b. FIGS. 3a and 3b represent a cross section of the marine object 1 along the plane P at right angles to the axis of rotation xo, when the arm is in its retracted position (FIG. 3a) and in its deployed position (FIG. 3b). The arm 8 is linked to the body 3 by means of an articulation 9 with a degree of freedom in rotation about an axis of rotation xo, allowing the arm 8 to pivot reversibly between the retracted position, represented in FIGS. 2a and 3a, in which the arm 8 is housed in the housing 6 and is flush with the curved surface 4, and a deployed position, represented in FIGS. 2b and 3b, in which the arm 8 extends out of said body 3. The arm 8 is rotated about the axis of rotation xo by means of a rotary actuator 80 housed in the general section of the body 3. The reversibility is obtained by rotation about the axis of rotation of the articulation.

The axis of rotation xo is at right angles to the plane of FIGS. 3a and 3b and passes through the cross section represented on each of these figures. In the embodiment of the figures, the axis of rotation xo is parallel to the main axis x of the underwater vehicle, but it could form a non-zero angle with this latter axis x. The arm 8 passes through the opening 104, referenced in FIG. 3b, to switch from the deployed position to the retracted position and vice versa. In its retracted position, the arm 8 substantially closes the opening 104. In other words, the arm 8 substantially closes the opening to within the operating tolerances.

The position of the arm 8 can also be seen in FIGS. 2a and 2b in which the arm 8 is in the retracted position and, respectively, deployed position.

The arm 8 extends between a first end 11 and a second end 12. The first end 11 is closer to the articulation joint 9 than the head 12. The arm 8 comprises a first surface 10, called an outer surface 10. The outer surface 10 is oriented toward the outside of the body 3 when the arm 8 is in the retracted position. It is then rigid with the curved surface 4. In other words, the arm 8 and outer surface 10 has a form intended to be in the continuity of, or continuous with, the curve of the curved surface 4 of the body 3 when the arm 8 is in the retracted position. The outer surface 10 is a curved surface which is curved in the direction of the length of the arm 8. In other words, the change of direction is obtained over the length of the arm from the first end 11 to the second end 12.

The invention offers the advantage of exploiting the curvature of the surface 4 to house the arm 8 which will make it possible to release the emitting/receiving devices above the surface of the water. The proposed solution makes it possible to limit the bulk on the body along the axis x. It further offers the advantages of being as effective as a solution with a fixed strut of the same useful height (height of the strut head relative to the surface of the water) whatever the sea conditions and of not affecting the hydrodynamic (or aerodynamic) profile of the underwater vehicle when the arm is in the retracted position. The impact on the drag of the underwater vehicle is almost zero; the arm, once folded back, is perfectly incorporated in the cylindrical sketch of the body of the underwater vehicle. This is a major point, because endurance is one of the issues of any underwater vehicle in general, and of drones in particular. Finally, the bulk of the solution in the internal volume of the vehicle is particularly reduced compared to the solutions with hoistable strut. Thus, the internal accommodation capacity of the vehicle is safeguarded, which is a crucial element for the ease of integration of the system onboard underwater vehicles.

Advantageously, as represented in FIGS. 3a and 3b, the arm 8 is curved in the direction of its length and its curvature follows the curvature of the outer surface at least over most of its length. In other words, the arm 8 comprises a second face 13, called inner face 13, housed inside the body 3 when the arm 8 is in the retracted position. This inner face 13 follows the curvature of the outer surface 10 at least over most of its length. This makes it possible to minimize the impact on the accommodation capacity of the body of the underwater vehicle.

In the embodiment of the figures, the axis of rotation xo is parallel to the main axis x of the underwater vehicle. This solution is particularly advantageous because it makes it possible to minimize the bulk within the body 3 along the axis x. In other words, the length of the cross-sectional part of the body 3 dedicated to the deployable device is minimal and substantially equal to the width of the arm 8 which makes it possible to minimize the reduction of the payload of the underwater vehicle, for a body of given length, or else to minimize the impact on the rake of the underwater vehicle.

The emitting/receiving devices 7 are housed in the portion of the arm situated between the articulation joint 9 and the second end 12. The end 12 is raised when the arm 8 switches from the retracted position to the deployed position. The arm 8 comprises, in its deployed position, the part, that is to say the culminating point of the object 3, at least in the vicinity of the arm 8.

The marine object or underwater vehicle 1 has positive or zero buoyancy. The marine object or underwater vehicle 1 is advantageously configured to be balanced such that a plane of flotation F of the body 3 is parallel to the surface of the water 2 when the object floats in calm sea conditions. The plane of flotation separates a part of the body 3 located above the surface of the water and a portion of the body 3 located below the surface of the water. Thus, as used herein, the "plane of flotation" is equivalent to the "water plane" as used in the art. The plane of flotation F is at right angles to the plane of FIGS. 3a and 3b. In other words in calm sea conditions, the surface of the water 2 is always parallel to the plane of flotation F relative to the object. It can thus be stated that the plane of flotation F defines a horizontal plane when the marine object or underwater vehicle 1 floats on the water. As can be seen in FIGS. 3*a* and 3*b*, the axis of rotation xo is parallel to the plane of flotation. This makes it possible, for a predetermined curved surface, for a predetermined length of the arm and a predetermined position of the articulation joint 9, to be able to bring the emitting/receiving devices to a maximum height relative to the surface of the water (maximum deployment elevation) with a minimal bulk along the axis of rotation xo. In the embodiment of the figures, the axis of rotation xo being parallel to the main axis of the underwater vehicle x, the bulk along the length of the vehicle is minimized.

The axis of rotation xo is not necessarily parallel to the plane of flotation F. The arm 8 is, for example, helical and extends in a plane at right angles to an axis of rotation that is inclined relative to the plane of flotation.

Advantageously, as can be seen in FIGS. 3*a* and 3*b*, the deployed position that can be seen in FIG. 3*b* is defined such that, when the arm 8 occupies the deployed position, a first part 30 of the arm 8 occupies a first position P1 defined in a reference frame relative to the plane of flotation. The first part 30 of the arm is the region of the arm 8 situated at the highest altitude when the arm is in the deployed position. The first position P1 is the highest position occupied by the arm 8 when the arm occupies the deployed position. The deployed position is defined such that an axis z, called vertical axis, passing through the first position P1 occupied by a first part 30 of the arm and the articulation joint 9, is at right angles to the plane of flotation F. The first part 30 of the arm is located near the second end 12 of the arm 8. In other words, most of the length of the arm between the articulation joint 9 and the end 12 is situated between the articulation joint 9 and the first part 30 of the arm. "Vertical axis z" should be understood to mean an axis at right angles to the plane of flotation F. This arrangement makes it possible to release the emitting/receiving devices 7 to the maximum for a predetermined surface 4, for a predetermined position of the articulation joint 9 on the surface 4 and for a given length of the arm 8.

In the embodiment of the figures, the articulation joint 9 is arranged substantially at a second position P2, in a reference frame relative to the plane of flotation. The position P2 is the position occupied by a second part 31 of the arm and a part of the body 3 when the arm 8 is in the retracted position. The second part 31 of the arm 8 is a portion of the arm 8 located at the highest altitude when the arm 8 is in the retracted position. The second position P2 is the highest position occupied by the arm 8 when the arm is in the retracted position. In other words, the articulation joint 9 is situated in the vicinity of the second part 31 of the arm 8. The articulation joint 9 is, moreover, arranged such that the vertical axis z passes through the second position P2 occupied by a second part 31 of the arm when the arm is in its retracted position. This arrangement makes it possible to release the arm 8 to the maximum and minimize the entry of the arm 8 into the size of the body 3 upon rotation of the arm 8 between the retracted position and the deployed position. This makes it possible to limit the length of the arm for a desired deployment altitude. The positions P1, P2 and P3 (which will be defined later) are defined at least by their altitude relative to the plane of flotation F.

The section 15 of the underwater vehicle 1 represented in FIG. 3*a* is a section or cross-sectional part of the body 3 of the underwater vehicle comprising the arm 8, when the arm 8 is in the retracted position. This section 15 is produced along the plane P shown in FIG. 1 and at right angles or perpendicular to the axis of rotation xo. The arm 8 being flush with the surface of the body 4 as shown in FIG. 3*a*, the section 15 is substantially identical to the section or cross-sectional part of the body 3 locally around said arm 8. Advantageously, the portion of the circumference, that is to say of the perimeter, of the curve 17 delimiting the section 15, over which the arm 8 extends between the articulation joint 9, that is to say between the region of the outer surface 10 situated above the articulation joint 9 along the axis z, and the first part 30 of the arm 8, is defined for a given position of the articulation joint 9 relative to the body 3, and for a predetermined angle formed between the plane of flotation F and the axis xo, so as to be the portion of the minimum circumference such that, when the arm 8 is in the deployed position, the distance separating the first part 30 of the arm and the articulation joint 9 on the vertical axis z is the maximum distance that can be obtained for the section 15. The angle of rotation of the arm between the retracted position and the deployed position is then defined as a function of the length of the arm.

In the embodiment of the figures, the section 15 is round and the curve 17 is a circle. The articulation joint 9 is situated substantially at the second position P2 occupied by the second part 31 when the arm 8 is retracted. In other words, the articulation joint 9 is situated substantially at the altitude of the second part 31. The axis of rotation xo is parallel to the plane of flotation. Consequently, the portion of the circumference of the circle 17 separating the articulation joint 9 and the first part 30 is substantially equal to half of the circumference of the circle. The arm 8 then pivots by an angle substantially equal to 180° between the deployed position and the retracted position. In other words, the third position P3, in a reference frame relative to the plane of flotation. P3 is the position occupied by the first part 30 when the arm is retracted to the lowest position occupied by the arm 8 when the arm is in the retracted position. When the arm is deployed, the first part 30 occupies the first position P1 which is the highest position occupied by the arm when it is deployed. This makes it possible to fully exploit the diameter of the vehicle, to release the antennas from the surface of the water. In effect, the altitude of the first part 30 above the articulation joint 9, once the arm is deployed, that is to say the altitude of the first position P1, is almost equal to the diameter of the vehicle. The intrinsic capacity of this system to maximize the distance of the antennas from the surface of the water merely increases the robustness of operation of the system with respect to the sea conditions. Given equal deployed antenna height, this solution is much more compact than a solution based on a strut rotating about a horizontal axis at right angles to the main axis of the underwater vehicle. In effect, the increase in the height of deployment of the arm does not affect the length of the section occupied by the deployable device but only the portion of the circumference occupied by the arm 8. In this embodiment, the length of the arm is greater than half of the circumference of the curve 17 delimiting the section 15. The arm pivots by an angle substantially equal to 180° about the axis of rotation between the retracted position and the deployed position.

Figure 4:
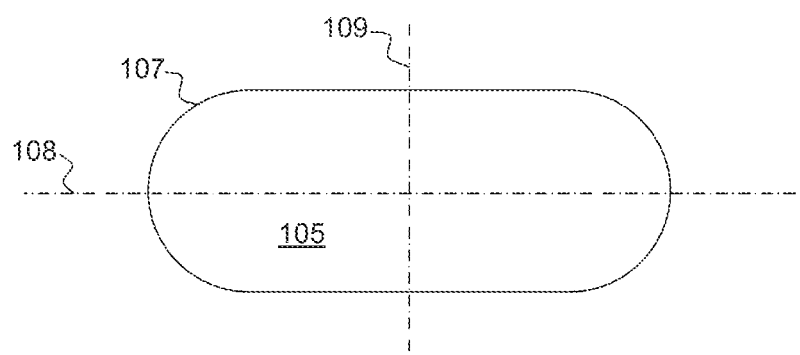

FIG. 4 shows the case of a section 105 delimited by an elliptical curve 107 defined by a great axis 108 and a small axis 109. The length of the half-great axis 108 is greater than the length of the small axis 109, so the optimum length for an articulation joint situated at the second part of the ellipse on the small axis when the plane of flotation is parallel to the great axis is equal to a quarter of the circumference of the ellipse and the angle of rotation is 90°. If the half-great axis had a length smaller than the small axis, then the optimum length would be half of the circumference and the angle of rotation of 180°.

As can be seen in FIG. 2b, the arm 8 comprises a strut 40 and a head 41. The head comprises the first part 30 visible in FIGS. 3a and 3b. The strut 40 is linked on the one hand to the articulation joint 9 and on the other hand to the head 41. The head 41 is arranged at the end of the arm. The emitting/receiving devices 7 are mounted on the head 41. This makes it possible to release the emitting/receiving devices 7 to a maximum altitude above the surface of the water 2 because, when the arm 8 is deployed, the head 41 is directly above the strut 40, the emitting/receiving devices are therefore the highest elements of the object when the arm 8 is deployed. In the embodiment of the figures, the head 41 delimits a closed housing 42 in which the emitting/receiving devices 7 are housed.

The invention makes it possible to install a plurality of antennas distributed around the first part 30 in a plane parallel to the plane of flotation F when the arm 8 is deployed, without affecting the accommodation capacity in the central part of the body 3 since these antennas are distributed along the surface 4 when the arm is retracted. The various antennas can thus profit from the same height of deployment which maximizes their reach and avoids an effect of mutual masking between the antennas.

Advantageously, the head 41 comprises a support 43 on which are mounted the emitting/receiving devices 7. The support 43 is substantially planar and extends parallel to the plane of flotation F when the arm 8 is in the deployed position. This arrangement makes it possible to avoid the mutual masking of the various emitting/receiving devices arranged on this surface. In the embodiment of the figures, the arm 8 extends substantially over half of the perimeter of the curve 17; the planar support 43 is parallel to the plane of flotation F, when the water is calm, when the arm 8 is deployed and retracted.

It is also possible to distribute the emitting/receiving devices 7 along the arm 8 between the articulation joint 9 and the second end 12 such that they are at different altitudes when the arm is deployed which makes it possible to maximize the useful payload surface area of light sources, and/or of the emitting/receiving devices. Since the outer surface 10 of the arm 8 is curved, the effect of mutual masking between the various emitting/receiving devices is minimized compared to that obtained in the case of an installation on a vertical strut. This minimizing of the masking effect does not affect the accommodation capacity of the body 3 in its central internal part of the body 3. In the example of the figures, if the emitting/receiving devices are distributed along the top half of the arm 8, that is to say along a quarter circle, facing the outer surface 10, these emitting/receiving devices are staggered in the horizontal plane, the masking effect is therefore minimized. As a variant, the arm comprises a strut extending from the first end 11 to the second end 12.

In the embodiment of the figures, the head 41 has a width greater than the strut 40 along an axis at right angles to the plane in which the arm 8 extends in the direction of its length. Thus, the space occupied by the deployable device along the section is limited and the space available in the head 41 for installing therein emitting/receiving devices which will be located at the same height once the arm is deployed is increased, without affecting the accommodation capacity in the central internal part of the body 3 and while minimizing the impact on the buoyancy of the body 3.

In the embodiment of the figures, the outer surface 10 of the arm 8 is convex and the first part 30 of the arm is included on the outer surface 10. In these figures, the first part 30 of the arm is, moreover, at the summit of a convex surface formed by the outer surface 10 which drops back toward the second end 12 on the one hand and toward the first end 11 on the other hand when the arm 8 is in the deployed position. This allows both for its good incorporation in the cylindrical outline of the body of the vehicle in the retracted position but also, and above all, favors the flow of the seawater, and does so in order to avoid any formation of a skin of seawater on the surface of the window. In effect, the consequence of formation of a skin of salt water, even of very small thickness, is the masking of the electromagnetic waves, such as the visual waves and the wireless waves, thus inherently canceling the main function of the relocation system: it is therefore a major risk. Generally, to obtain this effect, the outer surface 10 is a convex surface at least in a region encompassing the first part 30 of the arm 8. Moreover, this convex form confers on the window 45—a curved region encompassing the summit or part 30 of the arm and capping the housing 42—a mechanical robustness thus conferring on it a better resistance to immersion pressure with a minimum thickness of material. This small thickness of the window 45 minimizes the attenuation of the waves received and/or transmitted. Moreover, the small thickness of the window 45 contributes to a lightening of the strut head 41, which offers the following advantages: more stable roll-mode balance, of the AUV or of the UUV on the surface, need for a less powerful rotary actuator for the rotating of the mass: saving on weight and volume—onboard bulk—on the choice of the actuator. The thickness of the window is advantageously between 2 mm and 13 mm.

The emitting/receiving devices 7 are housed in the strut head 41. The housing 42 is advantageously closed in a watertight manner. This protects the antennas from the mechanical stresses due to the immersion of the autonomous underwater vehicle during its mission. It has, for example, a hydrostatic pressure resistance of 35 bar (i.e. 350 meters of immersion).

To optimize the weights, the marine object locally has neutral buoyancy in a region encompassing the arm 8. In the embodiment of the figures, this means that an emitting/receiving section comprising a section of the underwater vehicle provided with the deployable device and the deployable device itself has neutral buoyancy. The strut 40 advantageously has hollow section so as to delimit a second housing receiving the wiring linking antennas to beacon, flashing lights and/or receiver of visual signals to power supply and control boards retained.

The portion 46 of the outer surface 10 facing the emitting/receiving devices 7 is the outer surface of the window 45. Said window is advantageously transparent to the waves sent and/or detected by said emitting/receiving devices. For example, the portion 46 of the window included in the head 41 is transparent to both the frequencies of the UHF-VHF-GPS-iridium bands, i.e. in the 30 MHz-2 GHz band, and to the visible spectrum.

The rotary actuator 80 can be passive, for example of the torsion or controllable spring type. In the latter case, this makes it possible, once the vehicle is located, to remotely control the folding down of the deployable arm. In effect, when folded down, the arm is perfectly incorporated in the hydrodynamic profile of the vehicle, which makes it possible to implement the handling thereof while guaranteeing the integrity of the deployable device for emitting and/or receiving electromagnetic waves. This remote control can be produced from a surface vessel, by means of a satellite telephone communication link or by means of an underwater communication link. The satellite telephone communication advantageously uses a receiving antenna incorporated in the arm 8, while the underwater communication requires the presence of a hydrophone onboard the vehicle and a transducer onboard the surface vessel.

To mitigate any risk of breakdown of the communication systems, an emergency fallback device is provided. It is produced from a magnetic relay embedded onboard the body 3, which makes it possible, under the action of a magnet, to control the folding down of the strut. The choice of the magnetic technology makes it possible to dispense with tight hull passages, while remaining compatible with the different materials usually used for the production of the hulls of autonomous underwater vehicles (composite carbon fiber, glass fiber, etc.—aluminum, titanium). Operationally, a diver is required to apply a magnet to the hull, at a precise point (level with the embedded magnetic relay) of the vehicle.

The form of the housing 6 and of the arm 8 are defined in such a way that not only can the housing 6 accommodate the arm 8 in the retracted position, but also so as to allow for its free deployment to its deployed position. The form of the bottom 60 of the housing 6 complements the inner surface 13 of the arm.

The strut 40 is advantageously produced in aluminum. The strut is advantageously protected by a conversion treatment (electrolytic treatment) and possibly painted. The strut head 41, notably the portion 45 of the surface 10 included in the head 41, is advantageously produced in thermoplastic material of PMMA (polymethyl methacrylate) type for the good trade-off offered between its optical qualities, its density and its mechanical strength.

The body 3 can be the body of a submersible underwater vehicle, autonomous or not. This body 3 is also able to float. As a variant, the body 3 is the body of a floating object such as a buoy, for example an acoustic buoy drifting on the surface of the water. The buoys can have various forms, such as, for example, a toroidal, cylindrical or spherical form.

The body 3 can have, locally around the arm, a cylindrical form, the axis of rotation being advantageously parallel to the longitudinal axis of the cylinder. The cylinder can be a cylinder of revolution. The body can be a cylindrical body, for example, a portion of cylinder intended to be incorporated on an underwater vehicle.

The invention claimed is:

1. A submersible underwater vehicle able to float on a body of water in which the submersible underwater vehicle is placed, the submersible underwater vehicle comprising:
   a body delimited at least partially by a curved surface, wherein the body defines an enclosure extending into said body from said curved surface,
   a deployable device comprising an arm and at least one device for emitting and/or receiving electromagnetic waves mounted on said arm,
   said at least one device for emitting and/or receiving electromagnetic waves comprising at least one of the following: at least one emitter comprising at least a wireless communication antenna, a transceiver, or a light source; and at least one receiver comprising at least a wireless communication antenna, a transceiver, or a camera,
   said arm being linked to said body by an articulation joint with a degree of freedom in rotation about an axis of rotation (xo) of the arm about the articulation joint, the articulation joint allowing the arm to pivot reversibly between a retracted position, in which the arm is housed in the enclosure and is flush with the curved surface, and a deployed position in which the arm extends out of said enclosure,
   the arm comprising a first outer surface, said first outer surface being a curved surface, said first outer surface being flush with said curved surface of the body when the arm is in the retracted position, and
   wherein said deployable device is not deformed between the retracted position and the deployed position, and
   wherein the body defines locally, proximate the arm, a cylinder form, the axis of rotation (xo) of the arm about the articulation joint being parallel to a longitudinal axis of said cylinder form of the body.

2. The submersible underwater vehicle as claimed in claim 1, in which the arm is curved, a curvature of the arm following a curvature of said first outer surface.

3. The submersible underwater vehicle as claimed in claim 2, in which said arm extends in a plane perpendicular to said axis of rotation (xo).

4. The submersible underwater vehicle as claimed in claim 1, in which said submersible underwater vehicle is balanced such that the axis of rotation (xo) is parallel to a water plane (F) defined as parallel to a surface of the body of water in calm conditions,
   the arm extending from a first end to a second end, wherein the second end of the arm is further away from the articulation joint than the first end of the arm,
   said arm comprising a first part of the arm located at a maximum distance above the water plane (F) when the arm is in the deployed position, the first part of the arm being situated on the second end.

5. The submersible underwater vehicle as claimed in claim 4, in which the deployed position is defined such that, when the arm occupies the deployed position, a vertical axis (z), passing through the first part of the arm and the articulation joint, is perpendicular to the water plane (F).

6. The submersible underwater vehicle as claimed in claim 5, in which the arm comprises a second part of the arm located at a maximum distance above the water plane (F) when the arm is in the retracted position, the second part of the arm being located on the vertical axis (z).

7. The submersible underwater vehicle as claimed in claim 4, in which the body defines a cross-sectional part of the body comprising the arm, the cross-sectional part of the body being disposed in a plane perpendicular to the axis of rotation (xo), the cross-sectional part of the body being circumferentially delimited by a closed curve, said closed curve having a perimeter;
   wherein a portion of the perimeter over which the arm extends between the articulation joint and the first part of the arm is defined, for a given position of the articulation joint relative to the body and for a predetermined angle formed between the axis of rotation (xo) and the water plane (F), as being a minimum portion of the perimeter such that, when the arm is in the deployed position, a distance separating the first part of the arm from the articulation joint along a vertical axis (z) is a maximum distance that can be obtained for said cross-sectional part of the body.

8. The submersible underwater vehicle as claimed in claim 7, in which the closed curve is a circle, and in which said portion of the perimeter is equal to half of a circumference of the circle.

9. The submersible underwater vehicle as claimed in claim 8, in which a length of the arm is greater than half of a circumference of the circle, the arm pivoting by an angle substantially equal to 180° between the deployed position and the retracted position.

10. The submersible underwater vehicle as claimed in claim 7, in which the arm comprises a strut linking a head to the articulation joint, the head comprising the first part of the arm and delimiting a housing in which are housed the at least one device for emitting and/or receiving electromagnetic waves.

11. The submersible underwater vehicle as claimed in claim 10, in which the head comprises a support on which are mounted the at least one device for emitting and/or receiving electromagnetic waves, the support extending substantially parallel to the water plane (F), in calm sea conditions, when the arm is in the deployed position.

12. The submersible underwater vehicle as claimed in claim 11, in which the head is wider than the strut.

13. The submersible underwater vehicle as claimed in claim 4, in which the first part of the arm is included on the first outer surface of the arm, in which the first outer surface is convex at the first part of the arm.

14. The submersible underwater vehicle as claimed in claim 1, in which the cylinder form is a cylinder of revolution.

15. The submersible underwater vehicle as claimed claim 1, said submersible underwater vehicle locally having neutral buoyancy, in a cross-sectional part comprising the arm.

16. The submersible underwater vehicle as claimed in claim 1, in which, in the retracted position, the arm substantially closes an opening formed in the curved surface of the body by said enclosure.

17. The submersible underwater vehicle as claimed in claim 1, in which the first outer surface is continuous with the curved surface of the body when the arm is in the retracted position.

18. The submersible underwater vehicle as claimed in claim 1, comprising a rotary actuator, the arm being rotated about the axis of rotation (xo) by the rotary actuator housed in the body.

19. The submersible underwater vehicle as claimed in claim 1, in which the actuator is controllable.

* * * * *